United States Patent [19]

Jubenville, deceased

[11] 3,840,276
[45] Oct. 8, 1974

[54] CONTROL CIRCUIT FOR AUTOMATIC BRAKE SYSTEM

[76] Inventor: Arthur R. Jubenville, deceased, late of 20 Grist Mill Ln., Halesite, N.Y. 11743 by Irene L. Jubenville, administratrix

[22] Filed: Oct. 11, 1973

[21] Appl. No.: 405,689

[52] U.S. Cl. ............... 303/20, 180/103, 188/3 R, 303/7
[51] Int. Cl. ............................................. B60t 7/12
[58] Field of Search ................. 180/82 R, 103–104; 188/3 R, 112, 181 A; 280/446 B; 303/3, 7, 15, 20, 21 CE, 24 A; 340/52 R, 52 B

[56] References Cited
UNITED STATES PATENTS

| | | | |
|---|---|---|---|
| 2,780,832 | 12/1973 | Marshall | 188/3 R |
| 3,566,987 | 3/1971 | Franzel | 180/103 |
| 3,715,003 | 2/1973 | Jubenville | 180/103 |
| 3,758,165 | 9/1973 | Savelli | 303/20 |

Primary Examiner—Trygve M. Blix
Assistant Examiner—Stephen G. Kunin
Attorney, Agent, or Firm—Richard L. Miller

[57] ABSTRACT

The invention describes a control circuit for use with an automobile brake system in vehicles having a towed portion and a towing portion. The control circuit includes a control unit responsive to a sensing device which detects displacement of the towed portion to produce a warning signal upon limited displacement and a brake signal upon excessive displacement. The control circuit also includes a control console which can be placed in view of the operator of the vehicle and includes a safety lamp which indicates that the system is on, an off lamp indicating that the system is not deactivated and thereby indicating to the driver that the vehicle is in danger, and a warning lamp responding to the warning signal from the sensing device through the control unit. An on-off switch is located on the control console as well as a braking intensity switch which controls moderate or vigorous braking action on the brakes of the towed vehicle. The control circuit is used to monitor the system as well as to check out faults and problems with the system.

10 Claims, 2 Drawing Figures

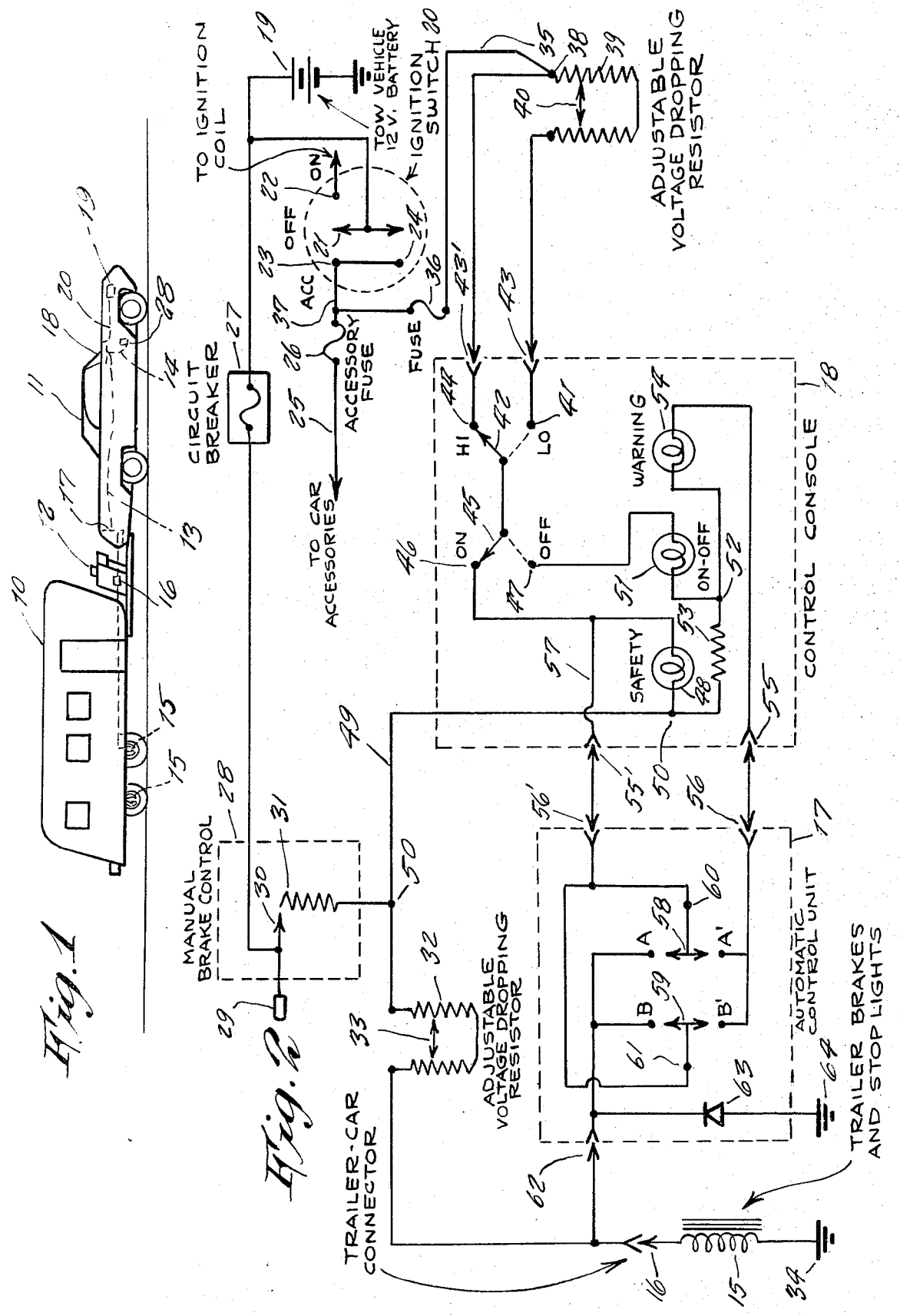

CONTROL CIRCUIT FOR AUTOMATIC BRAKE SYSTEM

This invention relates to a trailer control system and, more particularly, to a control circuit for automatically monitoring and checking out a trailer brake system.

BACKGROUND OF THE INVENTION

One of the greatest problems in using a towed vehicle of the trailer type is that such vehicle, when subjected to a lateral force, tends to oscillate or fishtail and with sufficient force may skid and cause a jackknifing condition. The situation is further aggravated with increase in size of the trailer and/or the speed at which the trailer is being towed. With improved highway conditions permitting the use of trailers at increased speeds, the excessive oscillations of the trailer create the possibility of accidents involving both the trailer as well as other vehicles on the highway.

It has been found that one method of controlling the towed vehicle is to apply the brakes in such a manner that the brakes of the trailer portion have a greater braking force applied than the brakes of the towing portion. In the conventional trailer type vehicle the brakes of the trailer portion are connected to the brake system of the towing car so that upon application of the brakes in the towing car, the trailer brakes will also be applied. However, the brakes are connected such that the trailer brakes are usually applied before the car brakes.

While in theory the application of the braking force to the trailer portion should be sufficient to correct the oscillation, in practice this method does not always produce the desired results. There is usually a relatively great time delay until the operator of the vehicle can respond to the emergency and apply the brakes properly. This delay in applying the brakes can in fact further aggravate the fishtailing of the trailer. As the weight of the trailer portion shifts from one side to the opposite side unequally, the extra loading on one side, coupled with the delayed braking may cause an unequal application of the braking action which may in fact increase the oscillation to such an extent that the operator loses control of the trailer entirely.

The preferred method of correcting the oscillations or fishtailing of the trailer portion is to provide the braking action as soon as a situation becomes dangerous, and furthermore, to apply the braking action only to the trailer brakes. To accomplish the braking on the trailer portion independently of the towing car numerous sensing devices are used for early detection of oscillation in the trailer portion and selective application of braking action. One such anti-fishtail control system is described in U.S. Pat. No. 3,715,003, issued on Feb. 6, 1973, to the inventor of the present application. In that system, an acceleration sensing unit is located on the trailer portion to detect oscillations of the trailer and provide a warning signal when limited oscillations occur and to apply a brake signal when excessive oscillations occur.

Other types of displacement sensors are known in the art which are refered to as "G" load sensors which detect the acceleration of the trailer portion in a direction transverse to the movement of the trailer and convert the acceleration to a displacement function.

Although the sensing portion of brake control system is known in the art, it is necessary to provide a circuit in conjunction with the sensing device which permits the operator to monitor the operation of the control system, as well as to check out the system to be sure that the brakes and all the electrical equipment as well as the sensing devices are functioning properly.

It is therefore an object of this invention to provide a control circuit for an anti-fishtail control system which provides an indication of the operation of the control system.

A further object of the invention is to provide a control circuit for a trailer brake system which provides to the operator of the vehicle the capability of checking out various parts of the trailer brake system.

Another object of the invention is to provide a control circuit having a console unit located within view of the operator of the vehicle and which includes indication lamps showing the proper operation of the system as well as switches to change various parameters of the braking system.

Still a further object of the invention is to provide a control circuit for a trailer brake system which provide an indicating lamp that the system is operating properly and which does not interfere with the normal operation of the system even though the lamp burns out.

A further object of the invention is to provide a control circuit for a trailer brake system which can be easily installed into the towing car.

Another object of the invention is to provide a control circuit for a trailer brake system which provides means for checking out suitable operation of the braking system.

These and other objects, features and advantages of the invention will, in part, be pointed out with particularity, and will, in part, become obvious from the following more detailed description of the invention, taken in conjunction with the accompanying drawing, which forms an integral part thereof.

SUMMARY OF THE INVENTION

Briefly, this invention provides a control circuit in a vehicle brake system for a vehicle having a towed portion such as a trailer. The circuit comprises a control unit responsive to a sensing device detecting both limited and excessive displacement of the trailer portion of the vehicle. The control unit includes a switch having a first position responsive to the limited displacement to warn the operator of a dangerous condition and a second position responsive to excessive displacement to apply braking action to the trailer brakes. A control console unit within visibility of the operator of the vehicle includes a first indication lamp showing that the system is in operation, a second indication lamp when the system is turned off, and a warning lamp responsive to the first position output of the control unit switch. The control console also contains a first on-off switch, and a second switch controlling braking sensitivity and intensity. The control console is interconnected through an adjustable voltage dropping resistor to the ignition switch thereby obtaining power from the vehicle battery. The control unit is interconnected to the trailer brakes and stop lights thereby applying the braking action to the trailer brakes when needed.

BRIEF DESCRIPTION OF THE DRAWINGS

FIG. 1 is a diagramatic view of a towed vehicle and a towing vehicle, and

FIG. 2 is a schematic drawing showing the electrical circuit of the present invention.

DESCRIPTION OF THE PREFERRED EMBODIMENT

Referring now to FIG. 1, a preferred embodiment of the invention will now be described as installed in a vehicle having a towed portion and a towing portion illustratively as a trailer 10 towed by means of a conventional hitch 12 behind a towing vehicle shown illustratively as passenger car 11. The existing brake system in the car is controlled by the conventional brake pedal. A trailer-car coupler interconnecting the brakes is shown as 16. The electric circuit of the present invention includes a control unit coupled with an responsive to a sensor 17 mounted on the rear portion of the towing vehicle 11. It is understood that the sensor could similarly be connected directly within the trailer portion 10. The control unit 17 is electrically connected to the control console 18 by means of the cable 13. The control console is in turn electrically connected to the manual brake control 28 by means of cable 14, as well as connected to the battery 19 through the existing cable 20 which leads to an ignition switch located on the dashboard of the vehicle 11.

Referring now to FIG. 2 wherein like reference characters designate like parts as in FIG. 1, there is shown the vehicle battery 19, typically a 12V battery interconnected to the ignition switch 20. As is well known in the art the ignition switch contains an off position 21; an on position 22, which interconnects the power from the vehicle battery 19 to the ignition coil (not shown), and an accessory position 23 wherein car accessories can be energized without the necessity of the car motor running. When the ignition switch is turned from the off position 21 to the on position 22, the accessories are also energized by interconnecting position 24 with position 23, accessories will operate when the car is running. The accessories are energized through line 25 passing the accessory fuse 26.

The brake system in the towed vehicle also operates from the towing vehicle battery 19 through circuit breaker 27 to the manual brake control 28. Typically, manual brake control 28 is activated by a foot pedal or hand lever 29 which, when operated, closes the contact point 30 onto a resistor element 31, thereby interconnecting the electrical circuit and applying trailer brakes.

For controlling the towed vehicle brakes the system in the towing vehicle usually includes an adjustable voltage dropping resistor 32 including two resistors in series and a shorting control arm 33 which permits adjustment of the maximum current intensity through brake solenoid 15 when operated by manual brake control 28. When a towed vehicle, such as a trailer is connected to the towing vehicle, the coupling connector 19 is used to join the trailer brakes 15 to the existing brake system. The trailer brakes and stop lights are represented by a solenoid which has one end grounded at 34. A solenoid is generally used with electrical brake system to cause brake shoes to expand in proportion to current flow thereby providing effective braking action.

The additional electrical circuitry needed for the operation of this invention includes an interconnection along lines 35 through a fuse 36 to the accessory line 37 extending from the ignition switch 20. The line 35 is connected at point 38 to one end of another adjustable voltage dropping resistor 39 having an adjustable shorting arm 40 between two series resistors. The opposite end of the adjustable voltage dropping resistor 39 is interconnected by means of cable connector 43 to one contact of a switch 42 designated as the low contact point. The point 38 is directly connected through cable connector $43^1$ to the other contact 44 of switch 42 designated as the high contact point. Switch 42 is connected to switch 45 which has a first contact terminal 46 representing the on contact and a second contact 47 representing the off contact.

Interconnected to the on contact 46 is a first indicating lamp 48 representing the safety lamp and is typically a green lamp when energized. The other end of the safety lamp 48 is connected by means of line 49 which is the ground return for all lamps, to the junction point 50 between the manual brake control resistor 31 and the adjustable voltage dropping resistor 32.

Connected to the off contact 47 of switch 45 is a second indicating lamp 51 representing an on-off lamp and is typically a red lamp when energized. The other end of the on-off lamp 51 is connected at terminal 52 to a resistor 53 which connects to terminal 50. Also connected to terminal 52 is a warning lamp 54 whose other end is coupled by means of cable connectors 55 and 56 to the control unit 17. The warning lamp 54 is typically an amber lamp when energized. The on contact terminal 46 is also connected to the control unit 17 through line 57 by means of cable connectors $55^1$ and $56^1$ to the terminal points 60 and 61.

The control unit 17 includes switches 58 and 59 which act in response to a sensing device (not shown) whereby they can close onto first contact points A and B or second contact points $A^1$ and $B^1$. When contacting points A and B they interconnect terminal points 60 and 61 through cable connector 62 to the trailer brakes and stoplights solenoid 15. When switches 58 and 59 contact points $A^1$ and $B^1$, they interconnect terminal points 60 and 61 with the warning light 54. A diode 63 is connected in parallel with the solenoid 15 to ground 64 in order to suppress voltage spikes produced by the collapsing magnetic field in solenoid 15.

The present invention operates in conjunction with a sensing device of a type known in the art which can be mounted at the rear of the towing vehicle or in the trailer. The sensing device responds to oscillations in the trailer and produces outputs responsive to both limited and excessive displacements. When abnormal trailer behavior develops, the displacement causes forces to be transmitted to the sensor. By way of example, the sensor can contain a steel acceleration ball which triggers a switching mechanism as it rolls along a path. When a limited amount of oscillation occurs in the trailer, the ball rolls a first distance and a first switch is closed. When an excessive amount of oscillations occur the ball rolls a second distance, larger than the first distance and a second switch is closed. The control unit 17 is responsive to such a sensing device such that when the sensor closes the first switch indicating limited oscillations, switches 58 and 59 close onto contact points $A^1$ and $B^1$. When the sensor closes the second switch responding to excessive oscillations, the switches 58 and 59 will close onto the contact points A and B.

When the car is in operation, pushing down on the brake pedal 29 causes the contact 30 to close onto the resistor 31 thereby completing a circuit path from the vehicle battery 19, through the circuit braker 27, the brake control 28 and the adjustable voltage cropping 32. When the trailer portion is connected by means of the connector 19, the trailer brakes will also be energized. This normal operation will continue whether the ignition switch is turned on or off and regardless of the interconnection of the control circuit of the present invention.

When the ignition is turned on, or is turned to the accessory position, the present control circuit will be energized. In order to have the circuit operate, switch 45 is moved onto contact 46. A circuit path is then completed from the vehicle battery 19 through the ignition switch 20, fuse 36, and line 35 to terminal 38. Then, if switch 42 is in the high position 44, the path will continue directly from terminal 38 to switch 42. Should the switch 42 be in the low position 41, the path will include the adjustable voltage dropping resistor 39, the arm 40 and then onto contact terminal 41. In either case, the path will continue flowing through the switch 42 onto contact 46. The path will then flow through the lamp 48 to terminal point 50, along line 49 through the adjustable voltage dropping resistor 32 and its arm 33 to the solenoid 15 and to ground 34. Although current is in fact passing through the solenoid 15, the current is basically a "trickle" current since very little voltage is available. The effective resistance of the series combination of the voltage dropping resistors 39 and 32 and the trailer brake solenoid 15 compared with the lamp 48 are such that the majority of the voltage drop is across the lamp 48 so that the current which passes through the circuit to energize the safety lamp 48 will hardly be effective to actuate the trailer brakes. Thus, in its normal on position the safety lamp 48 is energized thereby indicating that the circuit is in proper working condition.

When the switch 45 is in the off position 47, a circuit will be completed from the vehicle battery 19 through the switches 42 and 45 to the terminal 47, through the on-off bulb 51, resistor 53, line 49, adjustable voltage dropping resistor 32, through the solenoid 15 to the ground 34. Once again, only a "trickle" current passes through the solenoid 15 with the voltage across it being insufficient to activate the brakes. The on-off bulb 51 when energized indicates that the system is in fact not working. Typically, the lamp 51 will be a red lamp which will indicate that further operation of the vehicle is in danger since the automatic braking system is not activated.

When the system is in operation and the switch 45 is on the contact 46, the control circuit is capable of responding to both the warning and the braking outputs produced by the sensing device. Should the sensing device detect a limited displacement causing the switches 58 and 59 to close onto position $A^1$ and $B^1$, a circuit path will be completed between the battery 19, the ignition switch 20, and line 35 to the switches 42 and 45, line 57, terminals 60 and 61, through the switches 58 and 59 to terminal $A^1$ and $B^1$. Then, through the cable connectors 56 and 55 to the warning bulb 54, resistor 53, line 49, voltage dropping resistor 32 and through solenoid 15 to ground 34. The voltage across the solenoid will be reduced so that the brakes will not be affected. In this manner, when the sensor reacts to a limited oscillation producing a first output signal, the warning bulb will turn on either intermittently or continuously depending on the number and duration of the oscillations. This provides the warning to the operator indicating that the speed should be reduced or some other corrective action should be taken.

When the sensing device detects excessive oscillations, it causes switches 58 and 59 to close onto position A and B. A braking action on the trailer brake will immediately take effect. The braking action will be caused by completing a circuit path from the voltage battery 19 through the ignition switch 20, the line 35 to the switches 42 and 45, terminal 46, line 57, cable connectors $56^1$ and $55^1$ to the terminal points 60 and 61. Then, through switches 58 and 59 to the terminal points A and B and then directly through the cable connectors 62 and 16 to the solenoid 15. It is noted that in this circuit path the current does not pass through the adjustable voltage dropping resistor 32 or any lamps. Therefore, there is now a sufficient voltage across the solenoid 15 to activate the brakes in the trailer portion.

When the switches 58 and 59 are closed onto terminal contacts A and B, the path does include the line 35 from the ignition switch 20 leading to the contact point 38. It is then possible to either include the adjustable voltage dropping resistor 39 and proceed to the low contact terminal 41 or, to eliminate the adjustable voltage dropping resistor and from contact terminal 38 go directly to the high contact terminal 44. By including the voltage dropping resistor 39, less voltage is applied across the brake solenoid 15 and the brakes will respond with limited force. When the adjustable voltage dropping resistor 39 is eliminated, almost all of the voltage from the battery 19 will appear across the solenoid 15 and a sudden activation of the trailer brakes will take place. The inclusion of the adjustable voltage dropping resistor 39 is done by means of the switch 42. Placed in its low position 41, the brakes will close without a sudden activation, because resistor 39 limits the intensity of current allowed to flow through solenoid 15, when operated by automatic control unit 17. Placed in its high position 44, the brakes will close with a vigorous braking action.

In normal operation, should a sudden and unexpected emergency develop it would be sufficient to reduce the speed by only a few miles per hour to bring the trailer portion into control. The low position would therefore be sufficient for normal operations. However, at higher highway speeds the extra vigorous braking action would be needed to noticeably reduce the speed of the trailer portion thus providing an extra margin of safety.

In summary, therefore, when the ignition switch is on and the switch 45 is placed onto position 46, the safety lamp 48, typically a green lamp, will be energized indicating that the system is working properly including the trailer brake electrical circuit, the connector 16 between the trailer and the car and the basic electrical portions of the control circuitry. When the switch 45 is turned off, the red lamp 51 will indicate a danger condition since the automatic braking system is not operating. When the sensing device recognizes limited oscillations the warning lamp 54 will be turned on. When the sensing device recognizes a full emergency condition with excessive oscillations, automatic braking action will take place in the brakes of the trailer. The braking intensity action can be controlled by means of switch 42 as needed. The adjustable voltage dropping resistors 39 and 32 can be properly adjusted for each vehicle and accompanying braking systems to insure that in normal operation the trailer brakes will not respond to the "trickle" current through the solenoid 15 but will only respond to the greater voltage caused by a braking action from the control unit. It is noted that should the green lamp 48 burn out, although there will be no constant indication that the system is in fact operating, the system will actually continue to operate, fully providing the necessary warning signals and the necessary braking action. The reason is that the current during the braking action and the warning signal pass through line 57 to the control unit and does not pass through the bulb 48.

Should any of the bulbs not turn on at its respectively appropriate time there results an indication that part of the system is not operating properly. For example, should the on-off lamp 51 not energize when the system is placed in its off position, it can indicate a loose cable or poor connection, a blown fuse, or a burnt out bulb. Should the warning lamp 54 not energize during the course of operation it can indicate that one of the wires is being grounded, a loose cable, or a burned out bulb. Should the green safety lamp 48 not turn on when the switch 45 is in position 46 it can indicate that there is no voltage, or that the brake circuit is not operating properly. In each case, suitable corrective action can be taken to remedy the situation. However, it is noted that the manual brake control is in complete operation regardless of the rest of the circuit.

Interconnecting the control circuit to the existing vehicle circuitry is relatively simple. The adjustable voltage dropping resistor 39 can be interconnected to the existing ignition switch by means of a single cable 35. The adjustable voltage dropping resistor 39 can be plugged into the control console 18 formed of printed circuit elements by means of a single cable plug 43, 43¹. The control unit 17 and the control console 18 can be interconnected by a single cable having a plug connection at either end and including 55, 55¹, 56 and 56¹. The control unit 17 is interconnected to the trailer brake cable by means of the cable plug 62. The cable connector 16 connecting the trailer and the car is standard with most vehicles and is part of the general interconnection of the brake system of the vehicle.

There has therefore been provided a control circuit for use in a trailer brake system which provides indications to the operator of the proper operation of the brake system as well as providing a means for checking out the entire brake system and easily detecting various parts of which are inoperative.

There has been disclosed heretofore the best embodiment of the invention presently contemplated. However, it is to be understood that various changes and modifications may be made thereto without the departing from the spirit of the invention.

What is claimed is:

1. A control circuit for an automatic brake system in a vehicle having a towed portion and a towing portion including battery means, first brake means in the towing portion, second brake means in the towed portion and sensing means detecting limited and excessive displacements of the towed portion in a direction transverse to the forward direction of movement, said control circuit comprising:

a. first intensity means (32) adapted to be serially interconnected between the first and second brake means for adjusting the response of the brakes;
   b. a control unit including, normally open first switch means (58 and 59) capable of closing onto first and second contacts and responsive to a detected limited displacement to close onto said first contact (A¹ and B¹), and responsive to a detected excessive displacement to close onto said second contact (A and B) which is adapted to be connected to the second brake means (15), and
   c. a control console including:
      i. second switch means (45) adapted to be coupled to the battery means and capable of closing onto third (46) and fourth (47) contacts;
      ii. first lamp means (48) interconnected between said third contact (46) and said first intensity means (32);
      iii. second lamp means (51) interconnected between said fourth contact (47) and said first intensity means (32); and
      iv. third lamp means (54) interconnected between said first conatact (A¹ and B¹) and first intensity means (32),
   said first switch means (58 and 59) being interconnected to said third contact (46), wherein when said second switch means (45) is closed onto said fourth contact (47) said second lamp means (51) is energized from the battery means; when said second switch means (45) is closed onto said third contact (46) said first lamp means (48) is energized from the battery means and said first switch means (58 and 59) can then energized said third lamp means (54) when closed onto said first contact (A¹ and B¹) and can activate the second brake means (15) when closed onto said second contact (A and B).

2. A control circuit for automatic brake systems as in claim 1 and further comprising second intensity means (39) and wherein said control console further comprises third switch means (42) in series with said second switch means (45) and capable of closing onto fifth and sixth contacts, said fifth contact (44) adapted to be coupled directly to the battery means, and said sixth contact (41) adapted to be coupled through said second intensity (39) means to the battery means.

3. A control circuit for automatic brake systems as in claim 2 and wherein the vehicle includes an ignition switch, and wherein the coupling from said fifth contact (44) and sixth contact (41) to the battery means is through the accessory switch position of the ignition switch.

4. A control circuit for an automatic brake system as in claim 3 and further comprising fuse means in series between said ignition switch and said fifth and sixth contacts.

5. A control circuit for an automatic brake system as in claim 2 and wherein said first and second intensity means includes an adjustable resistive element (39).

6. A control circuit for automatic brake systems as in claim 2 and wherein said control console is included within a housing adapted to be located within view of the operator of the vehicle.

7. A control circuit for an automatic brake system as in claim 6 and wherein said control unit is included within the sensing means, and further comprising cable means electrically interconnecting the sensing means with the control console.

8. A control circuit for an automatic brake system as in claim 1 and wherein the second brake means is controlled by solenoid means which is in series with said first intensity means (32) and has one end thereof connected to the vehicle ground.

9. A control circuit for an automatic brake system as in claim 8 and wherein said control unit further includes diode means coupled in parallel to said solenoid means between said first contact and said vehicle ground.

10. A control circuit for an automatic brake system as in claim 1 and further comprising resistor means (53) serially interconnected between said first intensity means (39) and both said second (51) and third lamp means (54).

* * * * *